(12) United States Patent
Tenny

(10) Patent No.: US 8,588,151 B2
(45) Date of Patent: Nov. 19, 2013

(54) ACCESS TERMINAL CAPABILITY UPDATE

(75) Inventor: Nathan E. Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 12/536,608

(22) Filed: Aug. 6, 2009

(65) Prior Publication Data

US 2010/0034094 A1    Feb. 11, 2010

Related U.S. Application Data

(60) Provisional application No. 61/087,279, filed on Aug. 8, 2008.

(51) Int. Cl.
*H04W 4/00*    (2009.01)
(52) U.S. Cl.
USPC ............ 370/329; 370/235; 370/326; 370/443
(58) Field of Classification Search
None
See application file for complete search history.

(56) References Cited

U.S. PATENT DOCUMENTS

| | | | |
|---|---|---|---|
| 6,101,392 A | 8/2000 | Corriveau | |
| 6,333,947 B1 | 12/2001 | Van Heeswyk et al. | |
| 6,671,511 B1 * | 12/2003 | Forssell et al. | 455/452.1 |
| 6,678,517 B2 | 1/2004 | Naim et al. | |
| 6,721,562 B2 | 4/2004 | Kelley | |
| 6,892,076 B2 | 5/2005 | Maalismaa et al. | |
| 6,898,429 B1 | 5/2005 | Vialen et al. | |
| 6,909,703 B2 | 6/2005 | Terry et al. | |
| 7,099,689 B2 | 8/2006 | Bahl et al. | |
| 7,123,590 B2 | 10/2006 | Mir et al. | |
| 7,158,810 B2 | 1/2007 | Schwarz et al. | |
| 7,177,658 B2 | 2/2007 | Willenegger et al. | |
| 7,184,792 B2 | 2/2007 | Mir | |
| 7,260,080 B2 | 8/2007 | Suumaki et al. | |
| 7,272,120 B2 | 9/2007 | Rajkotia | |
| 7,321,780 B2 | 1/2008 | Love et al. | |
| 7,340,615 B2 | 3/2008 | Krantz et al. | |
| 7,352,698 B2 | 4/2008 | Niwano et al. | |
| 7,433,334 B2 | 10/2008 | Marjelund et al. | |

(Continued)

FOREIGN PATENT DOCUMENTS

| | | |
|---|---|---|
| CN | 1521956 A | 8/2004 |
| CN | 1666554 A | 9/2005 |

(Continued)

OTHER PUBLICATIONS

Ericsson: "Proposed changes to the RRC protocol specification regarding RRC connection establishment and re-establishment procedures" 3GPP Draft; R2-99417, 3rd Generation Partnership Project (3GPP), Mobile Competence Centre ; 650, Route Des Lucioles ; F-06921 Sophia-Antipolis Cedex ; France, vol. RAN WG2, no. Berlin; May 21, 1999, XP050112770 [retrieved on May 21, 1999] the whole document.

(Continued)

*Primary Examiner* — Donald Mills
(74) *Attorney, Agent, or Firm* — John J. Ketchum

(57) ABSTRACT

Systems and methodologies are described that facilitate updating an access terminal's capability information in a wireless access node. Upon detecting a change in its capabilities, the access terminal transmits a message to the access node indicating the change. The message triggers the access node to determine the capability change associated with the access terminal, and to update its records to indicate the new capability information.

38 Claims, 7 Drawing Sheets

(56) References Cited

U.S. PATENT DOCUMENTS

| | | | |
|---|---|---|---|
| 7,647,033 B2 | 1/2010 | Uozumi et al. | |
| 7,693,543 B2 | 4/2010 | Schwarz et al. | |
| 7,804,837 B2 | 9/2010 | Maansaari et al. | |
| 7,907,560 B2 | 3/2011 | Jang et al. | |
| 8,130,705 B2 | 3/2012 | Bhattacharjee et al. | |
| 8,169,973 B2 | 5/2012 | Palenius et al. | |
| 2001/0010685 A1 | 8/2001 | Aho | |
| 2001/0026538 A1 | 10/2001 | Bruss | |
| 2002/0045458 A1* | 4/2002 | Parantainen et al. | 455/466 |
| 2003/0224820 A1* | 12/2003 | Einola et al. | 455/554.1 |
| 2004/0002366 A1 | 1/2004 | Cromer et al. | |
| 2004/0047328 A1 | 3/2004 | Proctor, Jr. et al. | |
| 2004/0081115 A1 | 4/2004 | Parsa et al. | |
| 2004/0198369 A1 | 10/2004 | Kwak et al. | |
| 2005/0128956 A1 | 6/2005 | Hsu et al. | |
| 2006/0019647 A1* | 1/2006 | Muhonen et al. | 455/419 |
| 2006/0133307 A1 | 6/2006 | Fukasawa et al. | |
| 2006/0211425 A1 | 9/2006 | Bae et al. | |
| 2006/0229102 A1 | 10/2006 | Kitazoe et al. | |
| 2006/0262732 A1 | 11/2006 | Joutsenvirta et al. | |
| 2007/0224990 A1 | 9/2007 | Edge et al. | |
| 2007/0254647 A1 | 11/2007 | Salkintzis | |
| 2008/0144582 A1 | 6/2008 | Das et al. | |
| 2008/0274739 A1 | 11/2008 | Wu | |
| 2008/0300027 A1 | 12/2008 | Dou et al. | |
| 2009/0077395 A1 | 3/2009 | Tsai | |
| 2009/0129339 A1 | 5/2009 | Young et al. | |
| 2009/0141783 A1 | 6/2009 | Kirrmann | |
| 2009/0149162 A1 | 6/2009 | Tenny | |
| 2009/0180414 A1* | 7/2009 | Maeda et al. | 370/311 |
| 2009/0196259 A1* | 8/2009 | Pani et al. | 370/332 |
| 2009/0270109 A1 | 10/2009 | Wang Helmersson et al. | |
| 2010/0182963 A1* | 7/2010 | Fischer et al. | 370/329 |
| 2010/0183051 A1 | 7/2010 | Margarit | |
| 2011/0099287 A1 | 4/2011 | Manor | |
| 2012/0195249 A1 | 8/2012 | Bhattacharjee et al. | |

FOREIGN PATENT DOCUMENTS

| | | | |
|---|---|---|---|
| EP | 1437912 A1 | 7/2004 | |
| EP | 1679914 A1 | 7/2006 | |
| EP | 1750469 A1 | 2/2007 | |
| JP | 2000152337 A | 5/2000 | |
| JP | 2002164838 A | 6/2002 | |
| JP | 2004320240 A | 11/2004 | |
| JP | 2005073261 A | 3/2005 | |
| JP | 2005525032 A | 8/2005 | |
| JP | 2005528050 A | 9/2005 | |
| JP | 2005536091 A | 11/2005 | |
| JP | 2006020339 A | 1/2006 | |
| JP | 2006054856 A | 2/2006 | |
| JP | 2006129440 A | 5/2006 | |
| JP | 2006516870 A | 7/2006 | |
| JP | 2006520170 A | 8/2006 | |
| JP | 2008503910 A | 2/2008 | |
| JP | 2009504041 A | 1/2009 | |
| JP | 2009530994 A | 8/2009 | |
| JP | 2010510694 A | 4/2010 | |
| KR | 20040086972 A | 10/2004 | |
| KR | 20050020458 A | 3/2005 | |
| KR | 100606047 | 7/2006 | |
| KR | 20060104258 A | 10/2006 | |
| TW | I253245 B | 4/2006 | |
| TW | I259000 B | 7/2006 | |
| WO | WO9963682 A2 | 12/1999 | |
| WO | WO0054536 A1 | 9/2000 | |
| WO | WO2004004407 A1 | 1/2004 | |
| WO | WO2004017540 A1 | 2/2004 | |
| WO | WO2005020618 A1 | 3/2005 | |
| WO | WO2005079097 A1 | 8/2005 | |
| WO | WO2005107311 A1 | 11/2005 | |
| WO | WO2006010312 A1 | 2/2006 | |
| WO | WO2006086497 A1 | 8/2006 | |
| WO | WO2007014630 A1 | 2/2007 | |
| WO | WO2007025138 A2 | 3/2007 | |
| WO | WO2007109695 | 9/2007 | |
| WO | WO2007144956 A1 | 12/2007 | |
| WO | WO2008043078 | 4/2008 | |

OTHER PUBLICATIONS

International Search Report and Written Opinion—PCT/US2009/053179—ISA/EPO—Nov. 25, 2009.

3GPP: "3GPP TR 25.813 v7.0.0 (Jun. 2006) 3rd Generation Partnership Project; Technical E Access Network; Evolved Universal Terrestrial Radio Access (E-Utra) and Evolved Univers Network (E-UTRAN); Radio interface protocol aspects (Release 7)" 3RD Generation P1 (3GPP); Technical Report (TR), XX, XX, vol. 25.813, No. WOO, Jun. 19, 2006 (2006-C XP002426125 cited in the application.

3GPP TS 25.306 v6.8.0 3rd Generation Partnership Project; Technical Specification Group Radio Access Network; UE Radio Access capabilities (Release 6) (Mar. 2006) pp. 1-33.

Anonymous: "Extract from: 3GPP TS 25.331 V6.10.0 (Jun. 2006) Technical Specification Project; Technical Specification Group Radio Access Network; Radio Resource Control (RR (Release 6), chapter 8.2.2.3 and 8.5.26" 3GPP, (Online) Jun. 2006, XP002468797 Publication Retrieved from the Internet:URL:ftp://ftp.3gpp.org/specs/archive/25_series/2: Feb. 13, 2008) cited in the application.

European Search Report—EP12169298—Search Authority—Munich—Jun. 28, 2012.

Nokia, Domoco: "Stage_2_Description of UE capability_for E-UTRAN," 3GPP TS-RAN R2-062211 (Online), Sep. 1, 2006, XP002468908 Internet Publicat Internet:URL:http://www.3gpp.org/ftp/tsg_ran/WG2_RL2/TSGR2_54/Documents/ > (retrieved.

Qualcomm Europe: "3GPP TSG-RAN WG2 meeting #55: R2-062961: Framework for UE LTE" (Online) Oct. 13, 2006, XP002468961 Internet Publication Retr URL:http://www.3gpp.org/ftp/tsg_ran/Wg2_RL2/TSGR2_55/Documents/ > chapter 2.1 and 2.2.

Universal Mobile Telecommunications System (UMTS); UE Radio Access capatilities definition (3GPP TS 25.306 version 7.0.0 Release 7): ETSI TS 125 306 ETSI Standards, European Telecom, Standards Institute, Sophia-Antipo, FR, vol. 3-R2, No. V700, Mar. 2006, XP014034281, ISSN: 0000-0001 cited in the applications chapter 4.5.1, in particular p. 8, lines 9-14.

Taiwan Search Report—TW098126794—TIPO—Nov. 24, 2012.

* cited by examiner

ACCESS TERMINAL CAPABILITY UPDATE

CLAIM OF PRIORITY UNDER 35 U.S.C. §119

The present Application for patent claims priority to Provisional Application No. 61/087,279 entitled "LTE UE Capability Update" filed Aug. 8, 2008, and assigned to the assignee hereof and hereby expressly incorporated by reference herein.

BACKGROUND

1. Field

This application is related generally to wireless communications, and more particularly to reporting capability changes in a wireless network.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple access terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Access terminals can be modified while connected to a wireless network, which can result in modification of terminal capabilities, available services, and/or the like. However, an access terminal's capability information is typically persistent as long as the access terminal remains connected to the network. The network is unaware of any changes to the access terminal. It would be desirable to have a method of updating the network to indicate capability changes in an access terminal.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects, a method of indicating a capability change for an access terminal in a wireless communications system comprises transmitting a connection setup message to the access terminal to establish a radio resource control (RRC) connection; receiving a message from the access terminal comprising a capability change indicator related to the access terminal; and determining a capability change in the access terminal based at least in part on the capability change indicator.

According to some aspects, an apparatus operable in a wireless communication system comprises means for generating a connection setup message to an access terminal to establish a radio connection; means for receiving a message related from the access terminal comprising a capability change indicator related to the access terminal; and means for determining a capability change in the access terminal based at least in part on the capability change indicator.

According to some aspects, an apparatus operable in a wireless communication system comprises a processor, configured to generate a connection setup message to an access terminal to establish a radio connection; receive a message related from the access terminal comprising a capability change indicator related to the access terminal; and determine a capability change in the access terminal based at least in part on the capability change indicator.

According to some aspects, a method for indicating a capability change in a wireless communication system comprises detecting a change in capability at a access terminal, the change occurring after an RRC connection has been released but while the terminal is connected to an access node; transmitting an RRC connection setup message to the access node to re-establish an RRC connection to the access node; receiving a connection setup message from the access node to establish the RRC connection; and transmitting a message to the access node comprising a capability change indicator denoting the change in capability, wherein the capability change indicator triggers the access node to determine a capability change in the access terminal based at least in part on the capability change indicator.

According to some aspects, an apparatus operable in a wireless communication system comprises means for detecting a change in capability at an access terminal, the change occurring after a radio connection has been released but while the access terminal is connected to an access node; means for generating a connection request to the access node to re-establish a radio connection to the access node; means for receiving a connection setup message from the access node to establish the radio connection; and means for generating a message to the access node comprising a capability change indicator denoting the change in capability, wherein the capability change indicator triggers the access node to determine a capability change in the access terminal based at least in part on the capability change indicator.

According to some aspects, an apparatus operable in a wireless communication system comprises a processor, configured to detect a change in capability at an access terminal, the change occurring after a radio connection has been released but while the access terminal is connected to an access node; generate a connection request to the access node to re-establish a radio connection to the access node; receive a connection setup message from the access node to establish the radio connection; and generate a message to the access node comprising a capability change indicator denoting the change in capability, wherein the capability change indicator triggers the access node to determine a capability change in the access terminal based at least in part on the capability change indicator.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
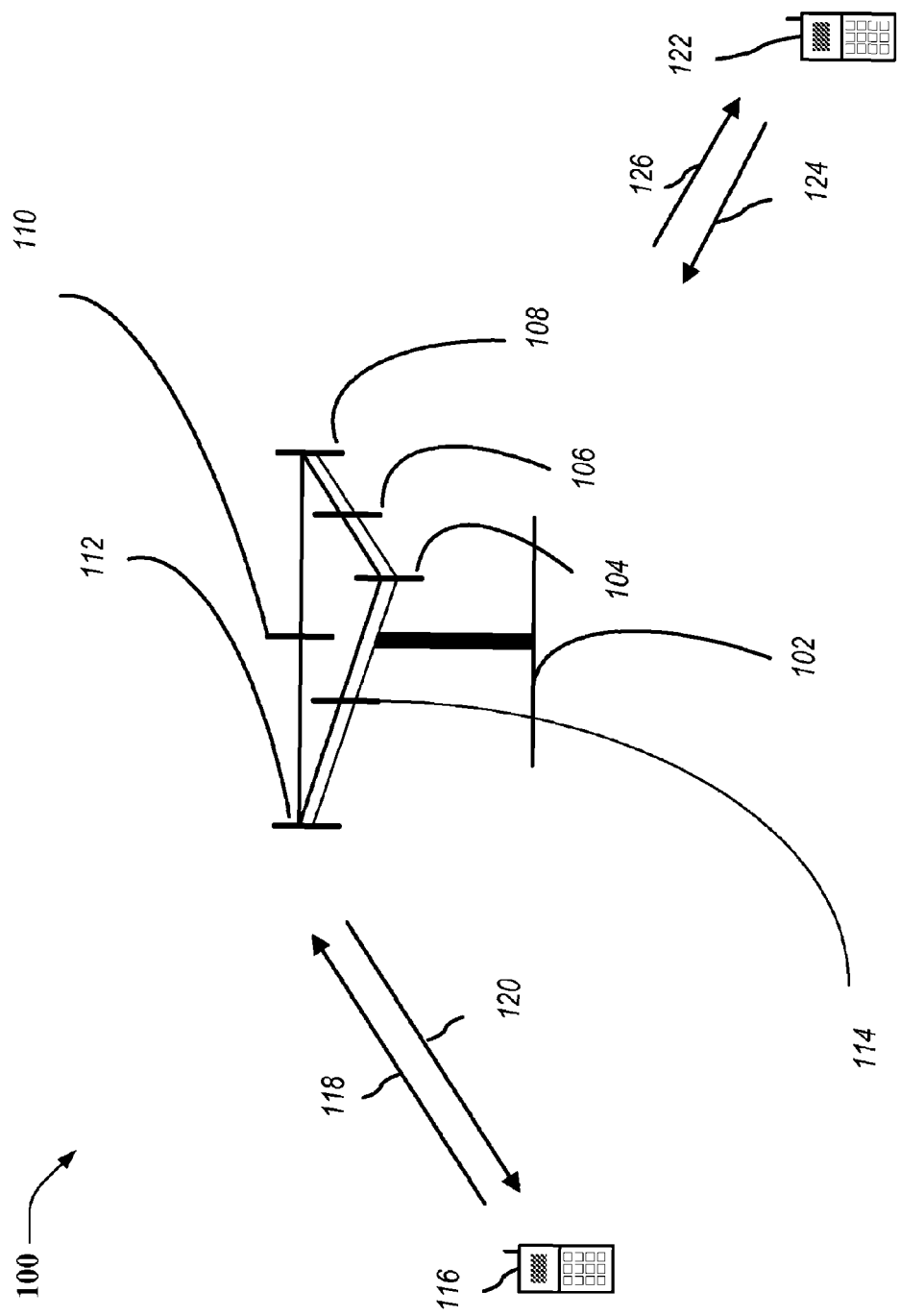
FIG. 1 illustrates a wireless communication system in accordance with various aspects set forth herein.

Referring to FIG. 1, a multiple access wireless communication system according to various disclosed aspects is illustrated. An access node 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access node. In the embodiment, antenna groups each are designed to communicate to access terminals in a sector of the areas covered by access node 100.

In communication over forward links 120 and 126, the transmitting antennas of access node 100 utilize beamforming in order to improve the signal-to-noise ratio of forward links for the different access terminals 116 and 124. Also, an access node using beamforming to transmit to access terminals scattered randomly through its coverage causes less interference to access terminals in neighboring cells than an access node transmitting through a single antenna to all its access terminals.

An access node may be a fixed station used for communicating with the terminals and may also be referred to as a Node B, eNode B (eNB), or some other terminology. An access terminal may also be called wireless terminal, user equipment (UE), a wireless communication device, terminal, or some other terminology.

Figure 2:
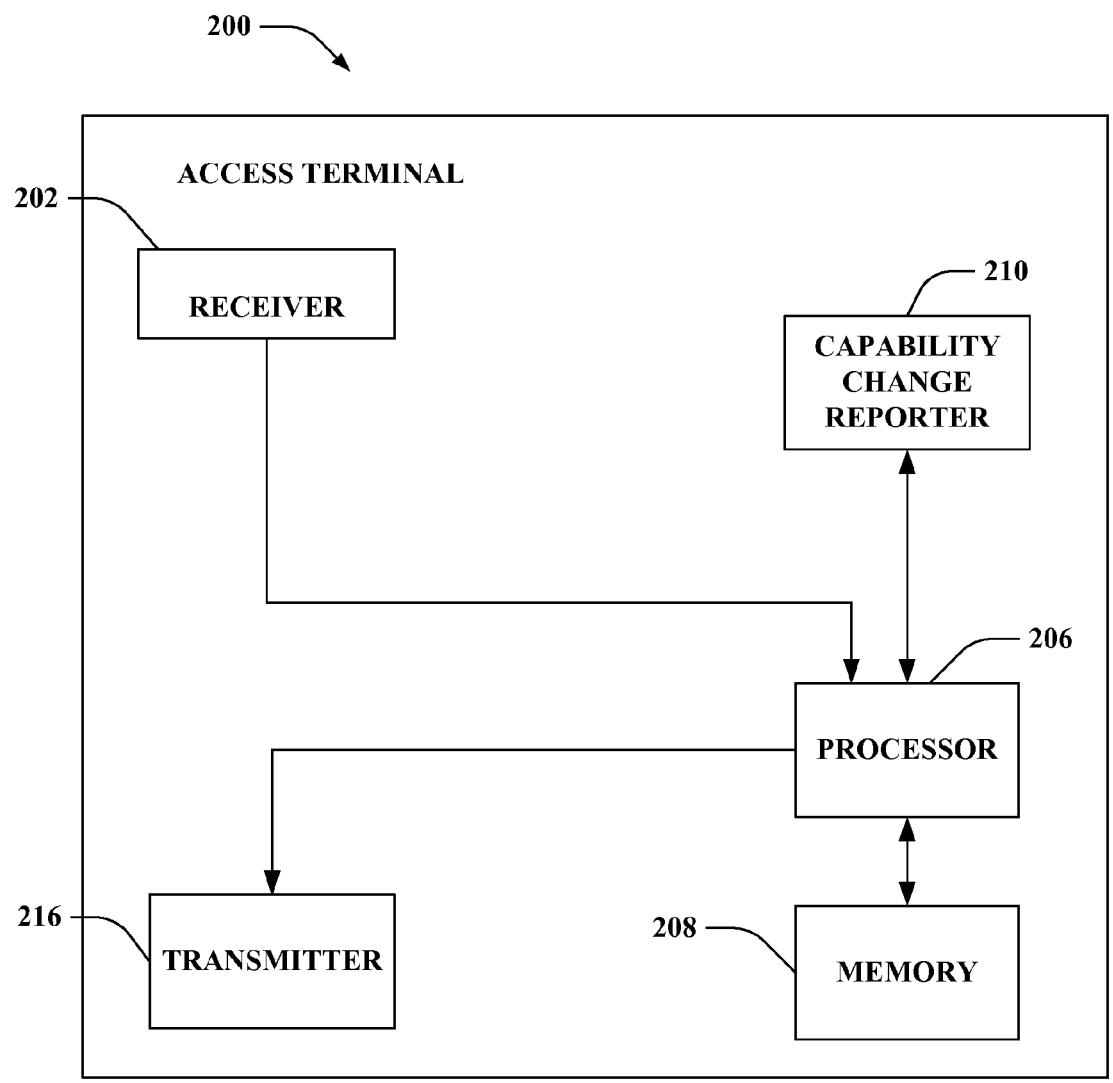
FIG. 2 illustrates an exemplary wireless device, in accordance with the various systems and networks discussed herein.

FIG. 2 depicts an exemplary access terminal that facilitates providing updated capability information regarding changes occurring in the access terminal. Access terminal 200 comprises a receiver 202 that receives a signal from, for instance, a receive antenna (not shown), performs typical actions on (e.g., filters, amplifies, downconverts, etc.) the received signal, and digitizes the conditioned signal to obtain samples. Receiver 202 can also be configured to demodulate received symbols and provide them to a processor 206 for channel estimation. Processor 206 can be a processor dedicated to analyzing information received by receiver 202 and/or generating information for transmission by a transmitter 216, a processor that controls one or more components of access terminal 200, and/or a processor that both analyzes information received by receiver 202, generates information for transmission by transmitter 216, and controls one or more components of access terminal 200.

Access terminal 200 can additionally comprise memory 208 that is operatively coupled to processor 206 and that can store data to be transmitted, received data, information related to available channels, data associated with analyzed signal and/or interference strength, information related to an assigned channel, power, rate, or the like, and any other suitable information for estimating a channel and communicating via the channel. Memory 208 can additionally store protocols and/or algorithms associated with estimating and/or utilizing a channel (e.g., performance based, capacity based, etc.).

It will be appreciated that the data store (e.g., memory 208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 208 of the subject systems and methods is intended to comprise, without being limited to, these and any other suitable types of memory.

Processor 206 can further be operatively coupled to a capability change reporter 210 that can detect changes in the capabilities of the mobile device, and can report such changes to a connected network. Access terminal 200 may terminate an RRC connection to an access node while still maintaining its physical connection to the network. As described above, the access node typically persistently stores access terminal capability information. That is, in a typical configuration, a access terminal does not report, and an access node does not determine, any changes to the capabilities of an access terminal that occur while the terminal is connected to the network. According to exemplary aspects, capability change reporter 210 enables capability changes to be reported to the network.

According to some aspects, the capability change reporter 210 may be configured to report capability changes to an access node upon re-establishing an RRC connection to the network. Thus, the capability change may be included in an RRC setup completion message. The capability change may be denoted by an indicator in the setup completion message, such as, for example, an additional bit added to the setup completion message. The indicator may trigger the access node to request the capability information of the access terminal, including any changes to the capability information. In other aspects, the actual changed capability information, in whole or in part, may be reported directly to the access node. While capability change reporter 210 is depicted as a separate element from processor 206, those of ordinary skill in the art will recognize that capability change reporter 210 would typically be integrated with processor 206.

Figure 3:
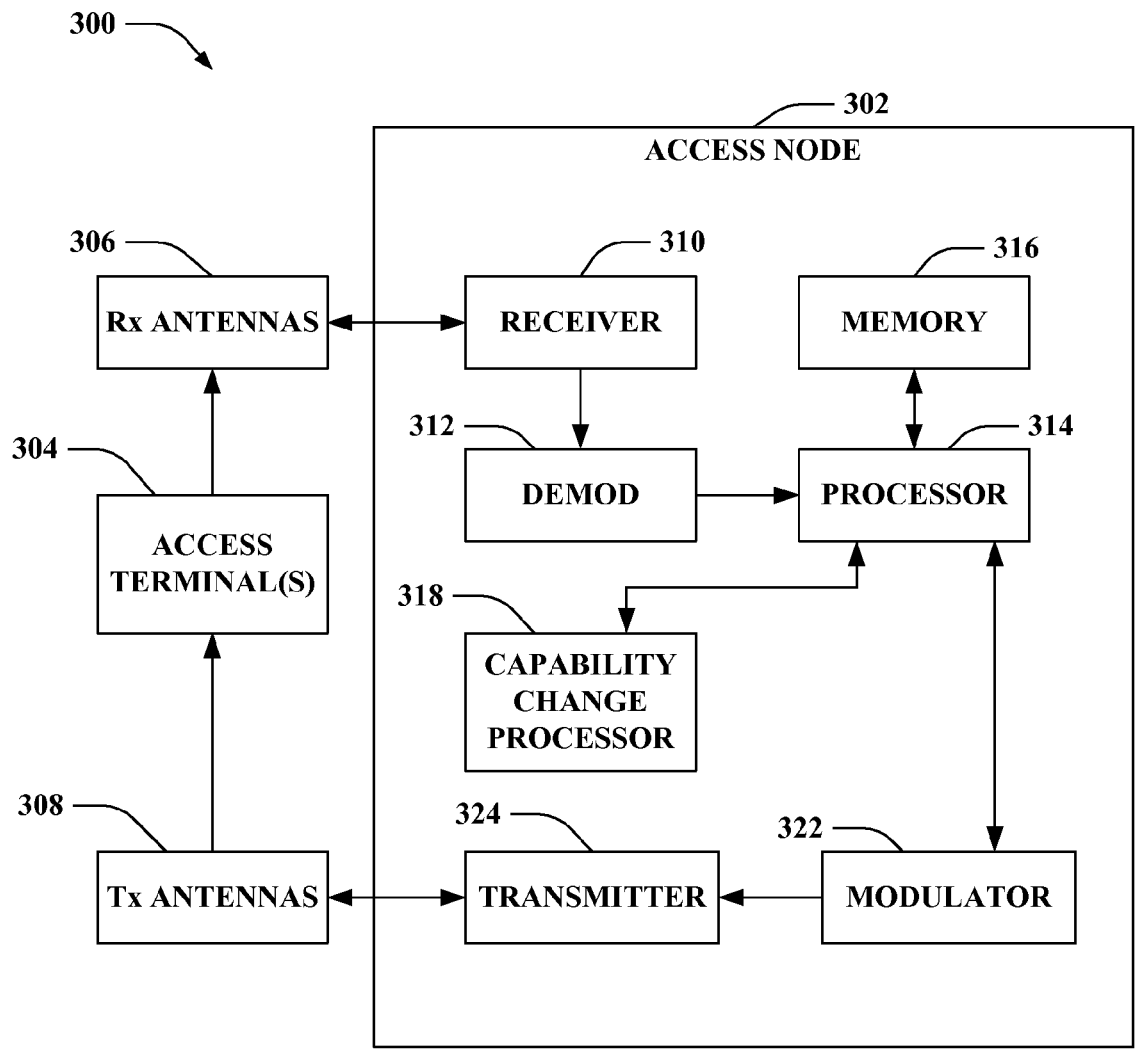
FIG. 3 illustrates an exemplary base station, in accordance with various systems and networks discussed herein.

FIG. 3 is an illustration of a system 300 that facilitates updating capability information associated with an access terminal. The system 300 comprises an access node 302 (e.g., access point, eNodeB, base station, . . . ) with a receiver 310 that receives signal(s) from one or more access terminals 304 through a plurality of receive antennas 306, and a transmitter 324 that transmits to the one or more mobile devices 304 through a transmit antenna 308. Receiver 310 can receive information from receive antennas 306 and demodulate the received information. Demodulated symbols are analyzed by a processor 314, which may be a processor dedicated to analyzing information received by receiver 310 and/or generating information for transmission by transmitter 324. For example, processor 314 may be configured to generate messages to establish a radio connection with access terminals 304. Processor 304 is coupled to a memory 316 that stores information related to estimating a signal (e.g., pilot) strength and/or interference strength, data to be transmitted to or received from access terminal(s) 304 (or a disparate base station (not shown)), and/or any other suitable information related to performing the various actions and functions set forth herein. Processor 314 is further coupled to a capability change processor 318.

The capability change processor 318 can receive information from a connected access terminal 304 regarding changes to its capabilities. The capability change processor 318 may be configured to store the capability information, for example, in an MME. Furthermore, although depicted as being separate from the processor 314, it is to be appreciated that the capability change processor 318 can be part of the processor 314 or multiple processors (not shown).

Figure 4:
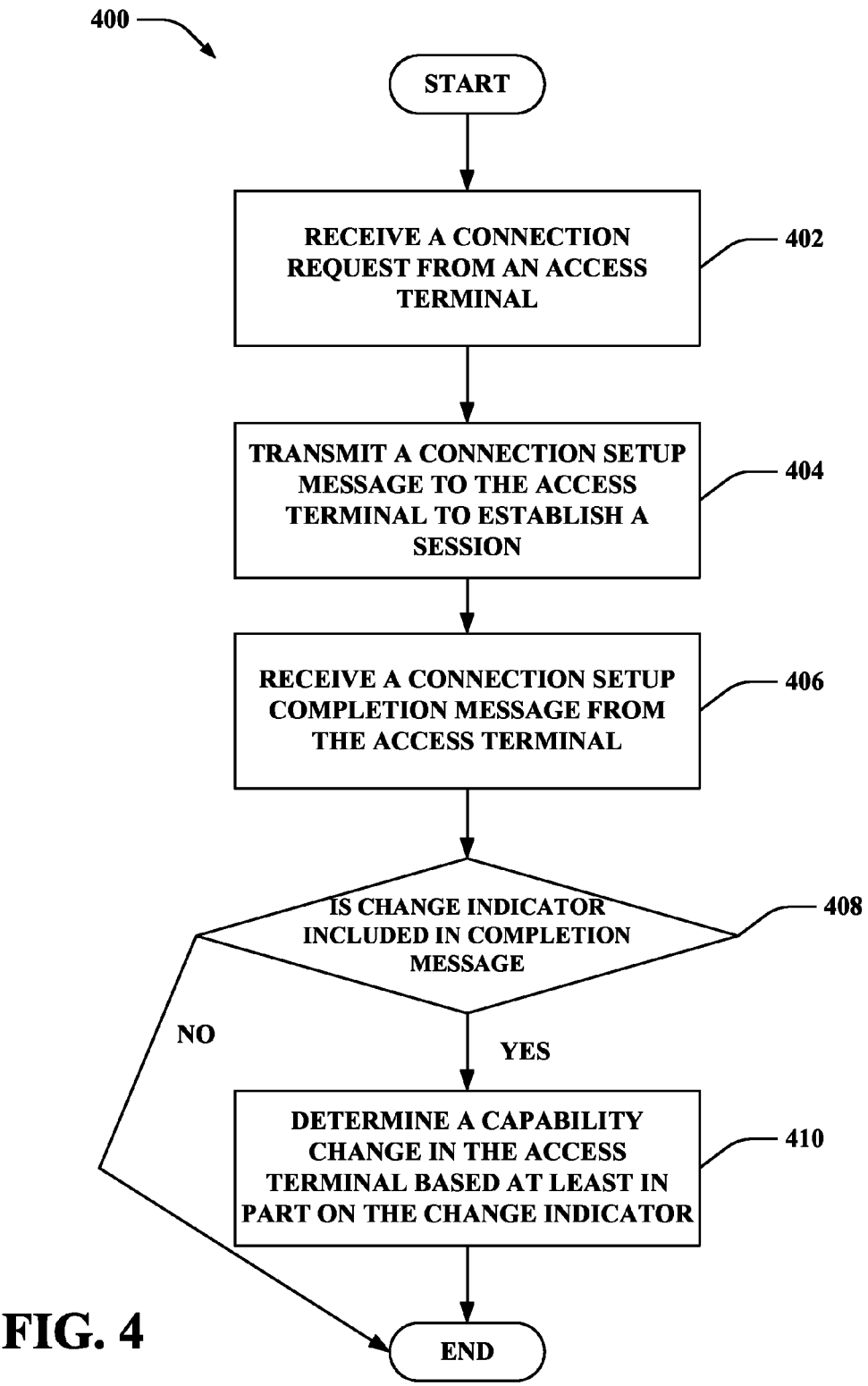
FIG. 4 is a flowchart illustrating a method of updating access terminal capability information, in accordance with various disclosed aspects.

Turning to FIG. 4, illustrated is an example methodology 400 that facilitates updating access terminal capabilities in a wireless network. For example, the access terminal capability can be stored at an MME. In this regard, the capabilities can be updated at each RRC connection establishment/re-establishment and/or when the capabilities have changed. Furthermore, the change in capabilities can be transmitted by the access terminal to the access node and/or the access node can request the changed capabilities upon receiving notification of such changes from the access terminal. Thus, at 402, a connection request to establish a radio connection to the access node may be received from an access terminal. The request may be, for example, an RRC connection request. As depicted at 404, a connection setup message may be transmitted to the access terminal to establish an RRC connection. According to some aspects, after a session has been established, the access node may transmit a capability inquiry message to the access terminal, e.g., if this is the first connection request received from the access terminal. The access terminal may respond to the capability inquiry by transmitting its capability indication to the access node. The capability information may be stored by the access node.

In some aspects, the RRC connection setup may follow a connection release, in one example, from a disparate access node. The access terminal, according to an example, can change capabilities (such as by user interface, attachment, detachment, or communication with another device, etc.). As depicted at 406, the access node may receive a setup completion message from the access terminal upon completion of the setup process. According to some exemplary aspects, the completion message may include a change indicator which denotes that the access terminal has changed capability since its capabilities were last reported to the access node. Thus, as depicted at 408, the access node may determine whether a change indicator is included in the completion message. If not, the process ends.

If a change indicator is included in the completion message, as depicted at 410, the access node may determine the capability change in the access terminal based at least in part on the change indicator. According to some aspects, the change indicator may trigger the access node to transmit a message to the access terminal to retrieve the new capability information. For example, change indicator may comprise a bit added to an RRC Connection Setup Complete message to indicate a change. In other aspects, the change indicator itself includes the changes to the access terminal's capabilities.

Figure 5:
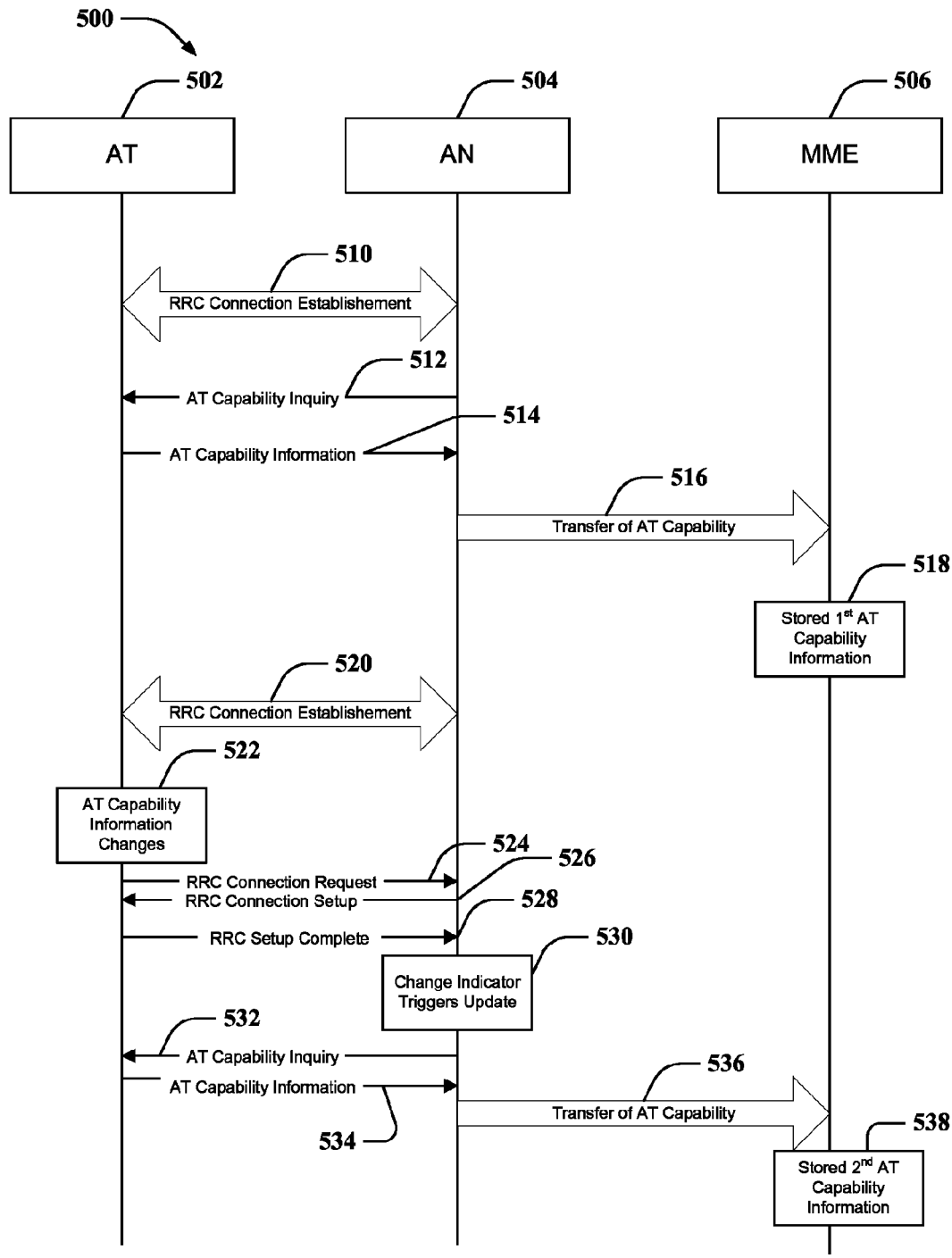
FIG. 5 illustrates an example message flow for update of access terminal capability, in accordance with various disclosed aspects.

FIG. 4 depicts determining whether a change indicator is included in a completion message, and determining a change capability based at least in part on the change indicator. According to some alternative aspects, the access node may initiate an access terminal capability transfer procedure after each RRC completion establishment. Moreover, while procedures have been described herein in relation to RRC messages, this is merely exemplary. Any other type of messages being transmitted in any layer of the protocol stack between an access terminal and an access node may be used to provide capability change information Referring to FIG. 5, illustrated is an example message flow 500 for updating access terminal capability. Communications between an AT 502, AN 504, and MME 506 are shown. As depicted at 510, an RRC connection may be established between AT 502 and AN 504. The connection establishment process may include, for example, transmitting an RRC connection request from AT 502 to AN 504, and, in reply, transmitting an RRC connection setup message from AN 504 to AT 502. The AT 502 may then respond with an RRC setup complete message.

After the initial connection establishment depicted at 510, AN 504 may not already have a stored capability for AT 502. Thus, as depicted at 512, AN 504 may autonomously initiate an AT capability update procedure by issuing an AT Capability Inquiry message to AT 502. AT 502 may reply by transmitting its capability information, as depicted at 514. As depicted at 516, the AN may transfer the AT capability information to MME 506 for storage. Thus, as depicted at 518, the MME 506 stores the capability information. While FIG. 5 depicts storing capability information in MME 506, this is merely exemplary. The AN 504 may store the capability information in any internal or external memory location accessible by the AN.

After the RRC connection has been released but while the AT 502 is still attached to the core network, the AT capability may change. For example, the AT 502 may receive a connection of an external device, a user-directed change of configuration, a new software version, and/or any other capability change. An RRC connection release is depicted at 520 and AT 502 capability change is depicted at 522.

As depicted at 524, the AT 502 may issue a new connection request to re-establish a connection to AN 504. AN 504 may reply with a connection setup message, as depicted at 526. The AN 502 then issues an RRC setup completion message, as depicted at 528. According to some aspects, the RRC setup completion message may include a change indicator denoting a change in the capabilities of AT 502. The change indicator may trigger the AN 504 to update the stored capability information for AT 502, as depicted at 530.

As depicted at 532, the AN 504 may issue an AT capability inquiry to request the new capability information associated with AT 502. The AT 502 replies with its capability information, as depicted at 534. While FIG. 5 depicts a change indicator that triggers AN 504 to request updated capability information, it is noted that in some aspects, the change indicator may include the changes in capability associated with the AN. Accordingly, steps 532 and 534 would be unnecessary in such aspects. As depicted at 536, the AN 504 may transfer the new AT capability to MME 506 for storage, as depicted at 538.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 6:
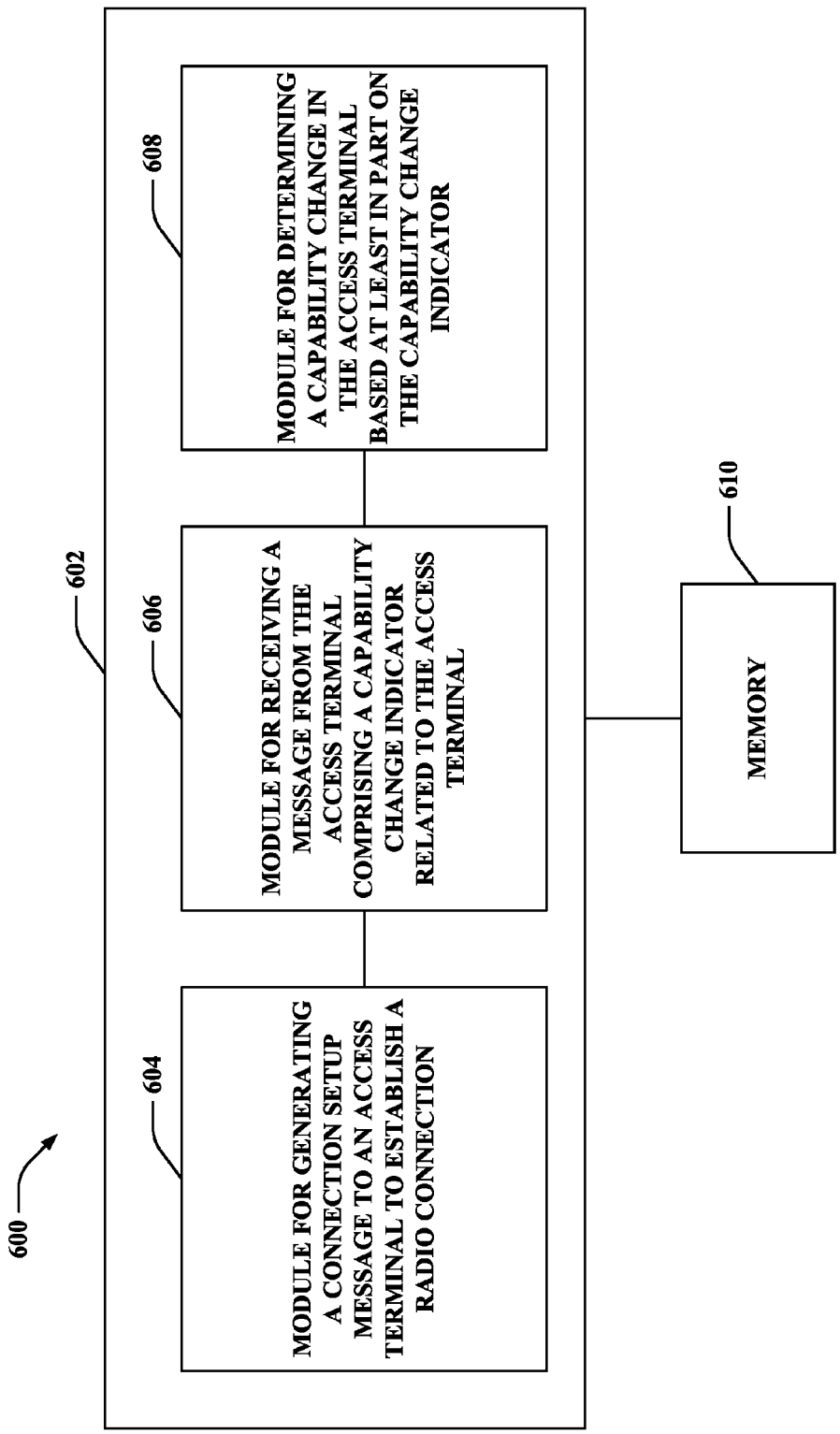
FIG. 6 is an illustration of an example system that broadcasts messages over a wireless media broadcast network.

With reference to FIG. 6, illustrated is a system 600 that transmits and processes messages received over a wireless access network. For example, system 600 can reside at least partially within a transmitter, access node, access point, eNodeB etc. It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction. For instance, logical grouping 602 can include a module for transmitting a connection setup message to an access terminal to establish a radio resource control (RRC) connection 604.

Further, logical grouping 602 can comprise a module for receiving a message from the access terminal comprising a capability change indicator related to the access terminal 606. Thus, as described, upon determining existence of a capability change indicator, the capability change indicator can be used for subsequent processing. Furthermore, logical grouping 602 can comprise a module for determining a capability change in the access terminal based at least in part on the capability change indicator 608. In this regard, if capability of the access terminal has changed, the access node can maintain accurate information regarding an access terminal's capabilities even after a connection has been released and re-established. Additionally, system 600 can include a memory 610 that retains instructions for executing functions associated with electrical components 604, 606, and 608. While shown as being external to memory 610, it is to be understood that one or more of electrical components 604, 606, and 608 can exist within memory 610.

Figure 7:
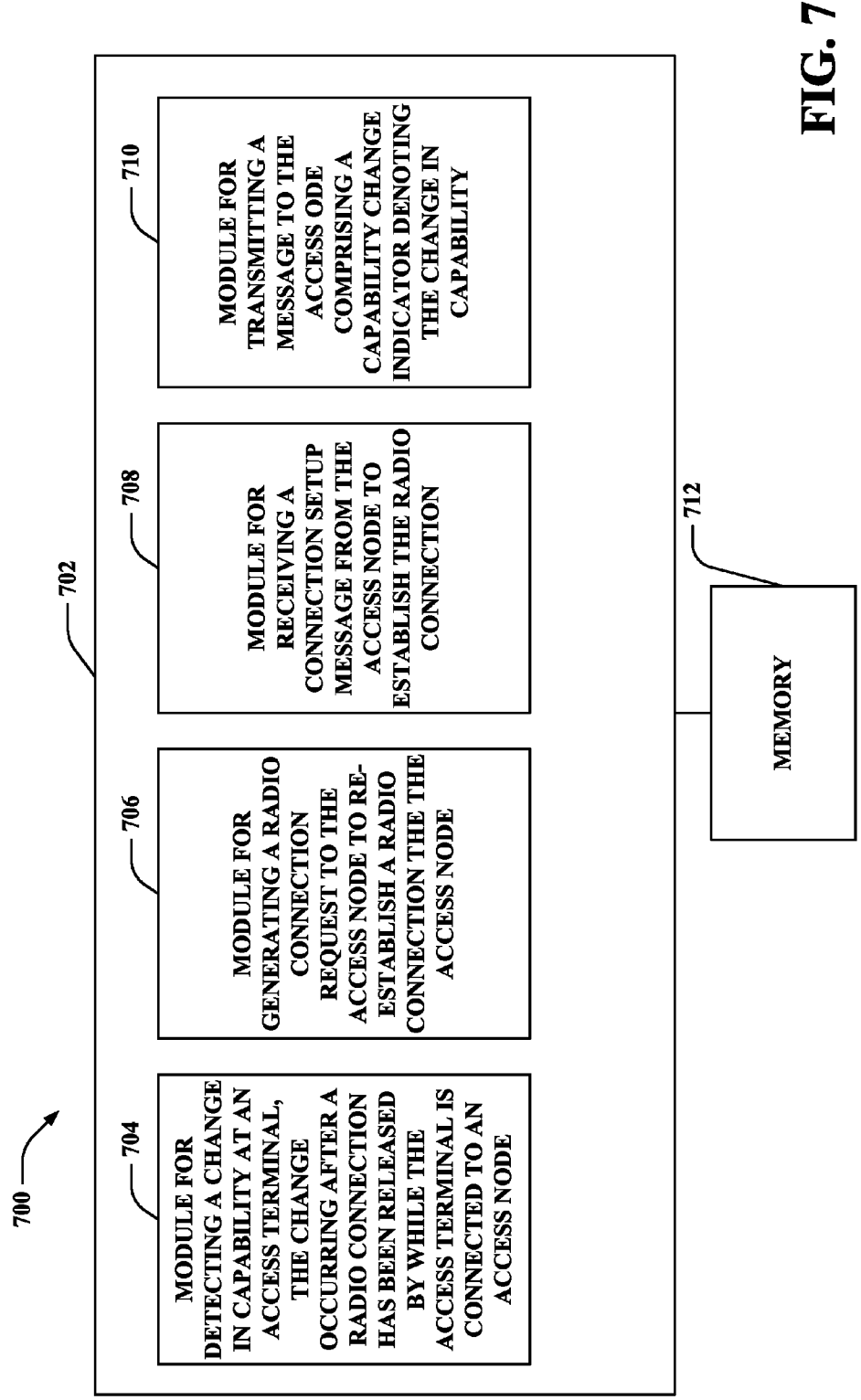
FIG. 7 is an illustration of an example system that receives and processes wireless broadcast messages.

Turning to FIG. 7, illustrated is a system 700 that receives and processes messages received over a wireless access network. For example, system 700 can reside at least partially within a transmitter, access terminal, wireless device, UE, etc. As depicted, system 700 includes functional blocks that can represent functions implemented by a processor, software, or combination thereof (e.g., firmware). System 700 includes a logical grouping 702 of electrical components that receiving and processing messages. Logical grouping 702 can include a module for detecting a change in capability at an access terminal, the change occurring after an RRC connection has been released but while the access terminal is connected to an access node 704. Moreover, logical grouping 702 can include a module for transmitting an RRC connection request to the access node to re-establish an RRC connection to the access node 706. Furthermore, logical grouping 702 can include a module for receiving a connection setup message from the access node to establish the RRC connection 708. The logical grouping 702 may also include a module for transmitting a message to the access node comprising a change indicator denoting the change in capability. In this regard, the capability change indicator triggers the access node to determine a capability change in the access terminal based at least in part on the capability change indicator. Additionally, system 700 can include a memory 712 that retains instructions for executing functions associated with electrical components 704, 706, and 708. While shown as being external to memory 712, it is to be understood that electrical components 704, 706, and 708 can exist within memory 712.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for indicating a capability change in a wireless communications system, comprising:
    transmitting a connection setup message to an access terminal to establish a radio connection;
    receiving a completion message sent by the access terminal in response to the connection setup message, the completion message including a capability change indicator related to the access terminal; and
    determining a capability change in the access terminal based at least in part on the capability change indicator wherein the capability change indicator indicates a change in a capability of the access terminal previously reported.

2. The method of claim 1, wherein the message comprising the capability change indicator is received after the capability change has occurred.

3. The method of claim 1, wherein the capability change indicator comprises a bit in the completion message.

4. The method of claim 1, wherein the capability change indicator specifies the change in capability.

5. The method of claim 1, further comprising:
    transmitting a capability inquiry message to the access terminal requesting new capability information related to the change in capability.

6. The method of claim 5, wherein the new capability information is stored in a mobility management entity.

7. The method of claim 1, wherein the capability change indicator indicates a specification directed change in capability of the access terminal.

8. The method of claim 1, wherein the capability change indicator indicates a new peripheral device connected to the access terminal.

9. The method of claim 1, wherein the capability change indicator indicates a user-triggered change affecting the change in capability of the access terminal.

10. An apparatus operable in a wireless communication system, the apparatus comprising:
    means for generating a connection setup message to an access terminal to establish a radio connection;
    means for receiving a completion message sent by the access terminal in response to the connection setup message, the completion message including a capability change indicator related to the access terminal; and
    means for determining a capability change in the access terminal based at least in part on the capability change indicator wherein the capability change indicator indicates a change in a capability of the access terminal previously reported.

11. The apparatus of claim 10, wherein the message is received after the capability change has occurred.

12. The apparatus of claim 10, wherein the capability change indicator comprises a bit in the completion message.

13. The apparatus of claim 10, wherein the capability change indicator specifies the change in capability.

14. The apparatus of claim 10, further comprising:
means for transmitting a capability inquiry message to the access terminal requesting new capability information related to the change in capability.

15. The apparatus of claim 14, wherein the new capability information is stored in a mobility management entity.

16. The apparatus of claim 10, wherein the capability change indicator indicates a specification directed change in capability of the access terminal.

17. The apparatus of claim 10, wherein the capability change indicator indicates a new peripheral device connected to the access terminal.

18. The apparatus of claim 10, wherein the capability change indicator indicates a user-triggered change affecting the change in capability of the access terminal.

19. A computer program product, comprising:
a non-transitory computer-readable medium comprising instructions executable by a processor, the instructions comprising:
a first set of codes for causing a computer to transmit a connection setup message to an access terminal to establish a radio connection;
a second set of codes for causing the computer to receive a completion message sent by the access terminal in response to the connection setup message, the completion message including a capability change indicator related to the access terminal; and
a third set of codes for causing the computer to determine a capability change in the access terminal based at least in part on the capability change indicator wherein the capability change indicator indicates a change in a capability of the access terminal previously reported.

20. An apparatus operable in a wireless communication system, the apparatus comprising:
a processor, configured to:
generate a connection setup message to an access terminal to establish a radio connection;
receive a completion message sent by the access terminal in response to the connection setup message, the completion message including a capability change indicator related to the access terminal; and
determine a capability change in the access terminal based at least in part on the capability change indicator wherein the capability change indicator indicates a change in a capability of the access terminal previously reported.

21. A method for indicating a capability change in a wireless communications system, comprising:
detecting a change in capability at an access terminal, the change in capability being a change in a capability of the access terminal previously reported, the change occurring after a radio connection has been released but while the access terminal is attached to a core network;
transmitting a radio connection request to an access node to establish a new radio connection to the access node;
receiving a connection setup message from the access node to establish the new radio connection; and
transmitting a completion message to the access node in response to receiving the connection setup message, the completion message including a capability change indicator denoting the change in capability.

22. The method of claim 21, wherein the completion message is transmitted after the change in capability has occurred.

23. The method of claim 21, wherein the capability change indicator comprises a bit in the completion message.

24. The method of claim 21, wherein the capability change indicator specifies the change in capability.

25. The method of claim 21, further comprising:
receiving a capability inquiry message from the access node requesting new capability information related to the change in capability.

26. The method of claim 21, wherein the capability change indicator indicates a specification directed change in capability of the access terminal.

27. The method of claim 21, wherein the capability change indicator indicates a new peripheral device connected to the access terminal.

28. The method of claim 21, wherein the capability change indicator indicates a user-triggered change affecting the change in capability of the access terminal.

29. An apparatus operable in a wireless communication system, the apparatus comprising:
means for detecting a change in capability at an access terminal, the change in capability being a change in a capability of the access terminal previously reported, the change occurring after a radio connection has been released but while the access terminal is attached to a core network;
means for generating a connection request to an access node to establish a new radio connection to the access node;
means for receiving a connection setup message from the access node to establish the new radio connection; and
means for generating a completion message to the access node in response to the connection setup message, the completion message including a capability change indicator denoting the change in capability.

30. The apparatus of claim 29, wherein the completion message is transmitted after the change in capability has occurred.

31. The apparatus of claim 29, wherein the capability change indicator comprises a bit in the completion message.

32. The apparatus of claim 29, wherein the capability change indicator specifies the change in capability.

33. The apparatus of claim 29, further comprising:
means for receiving a capability inquiry message from the access node requesting new capability information related to the change in capability.

34. The apparatus of claim 29, wherein the capability change indicator indicates a specification directed change in capability of the access terminal.

35. The apparatus of claim 29, wherein the capability change indicator indicates a new peripheral device connected to the access terminal.

36. The apparatus of claim 29, wherein the capability change indicator indicates a user-triggered change affecting the change in capability of the access terminal.

37. A computer program product, comprising:
a non-transitory computer-readable medium comprising instructions executable by a processor, the instructions comprising:
a first set of codes for causing a computer to detect a change in capability at an access terminal, the change in capability being a change in a capability of the access terminal previously reported, the change occurring after a radio connection has been released but while the access terminal is attached to a core network;

a second set of codes for causing the computer to transmit a radio connection request to an access node to establish a new radio connection to the access node;

a third set of codes for causing the computer to receive a connection setup message from the access node to establish the new radio connection; and a fourth set of codes for causing the computer to transmit a completion message to the access node in response to the connection setup message, the completion message including a capability change indicator denoting the change in capability.

38. An apparatus operable in a wireless communication system, the apparatus comprising:

a processor, configured to:

detect a change in capability at an access terminal, the change in capability being a change in a capability of the access terminal previously reported, the change occurring after a radio connection has been released but while the access terminal is attached to a core network;

generate a connection request to an access node to establish a new radio connection to the access node;

receive a connection setup message from the access node to establish the new radio connection; and generate a completion message to the access node in response to the connection setup message, the completion message including a capability change indicator denoting the change in capability.

\* \* \* \* \*